H. H. BROWNE.

ADVERTISING DEVICE.

No. 7,292. Reissued Sept. 5, 1876.

Witnesses.

Otto Hufeland

Robt E. Miller

Inventor.

H. H. Browne by

Van Santvoord & Hauff his attorneys.

N. PETERS, PHOTO-LITHOGRAPHER, WASHINGTON, D. C.

UNITED STATES PATENT OFFICE.

HENRY H. BROWNE, OF BROOKLYN, NEW YORK.

IMPROVEMENT IN ADVERTISING DEVICES.

Specification forming part of Letters Patent No. 78,923, dated June 16, 1868; reissue No. 7,292, dated September 5, 1876; application filed August 3, 1876.

*To all whom it may concern:*

Be it known that I, HENRY H. BROWNE, formerly of Mount Vernon, in the county of Westchester, in the State of New York, now of Brooklyn, in the county of Kings, and State of New York, have invented a new and useful Improvement in Advertising Devices, which improvement is fully set forth in the following specification, reference being had to the accompanying drawing, in which—

Figure 1:
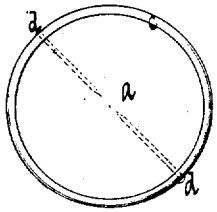
Figure 2:
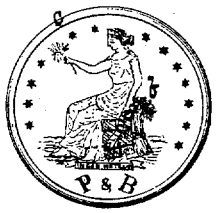
Figure 3:
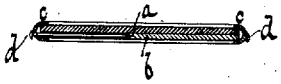
Figure 4:
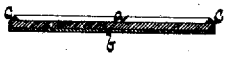

Figure 1 represents a face view of the side containing the mirror. Fig. 2 is a similar view of the side containing the advertising-card. Fig. 3 is a cross-section. Fig. 4 is a cross-section of a modification.

Similar letters indicate corresponding parts.

This invention consists in the combination of a metallic rim with a mirror and with a business-card, which is placed on the back of the mirror and retained in position by the metallic rim, which is either made separate from, or in one piece with, the business-card, and which serves to protect the mirror against abrasion. The metallic rim may be perforated with holes for the reception of pins.

In the drawing, the letter *a* designates a mirror, which may be of glass or other material, and the letter *b* designates a business or advertising card, which is placed on the back of the mirror, the two being connected or held together by means of a rim, *c*, turned down on one side over the edge of the mirror, and on the opposite side over the edge of the advertising-card; or, in case the rim is made in one piece with the business-card, it is only turned down on one side over the edge of the mirror, as shown in Fig. 4. The surface *b*, which contains the business designation or other information, is made of paper, card-board, metal, wood, or other material, and the designation or other information placed on it may be put thereon by printing, engraving, or stamping, according to the nature of the material or other circumstances. The rim *c* protects the edge of the mirror, and also, by its prominence, protects in some degree its surface from injury; and the said rim, where the obverse side that contains the business designation is in a separate piece from the body of the rim, also unites and holds such separate piece to the back of the mirror.

I do not confine myself to any particular shape or size in my combined mirror and card; but by means of my invention I produce a portable article of use and convenience, which can be easily carried in the pocket of a garment.

Another feature of my invention consists in combining with the mirror and card a pin-cushion or pin-holder formed in the rim *c*, which I perforate to receive pins *d*, as shown in the drawing, the perforations being more or less in number, and confined to one side, or made all round the rim, as may be preferred by the maker.

What I claim as new, and desire to secure by Letters Patent, is—

1. As a new article of manufacture, an advertising-card and a mirror combined and connected together by means of a rim, *c*, substantially in the manner shown and described.

2. The rim *c*, provided with holes for the reception of pins, in combination with a mirror, *a*, and advertising-card *b*, substantially as set forth.

In testimony that I claim the foregoing I have hereunto set my hand and seal this 28th day of July, 1876.

HENRY H. BROWNE. [L. S.]

Witnesses:

W. HAUFF,

E. F. KASTENHUBER.